US012641217B2

(12) United States Patent　　　　(10) Patent No.:　US 12,641,217 B2
Zhao et al.　　　　　　　　　　　　　(45) Date of Patent:　May 26, 2026

(54) SYSTEMS AND METHODS FOR JOINT CODING OF MOTION VECTOR DIFFERENCE USING TEMPLATE MATCHING BASED SCALING FACTOR DERIVATION

(71) Applicant: TENCENT AMERICA LLC, Palo Alto, CA (US)

(72) Inventors: Xin Zhao, San Jose, CA (US); Liang Zhao, Sunnyvale, CA (US); Shan Liu, San Jose, CA (US)

(73) Assignee: TENCENT AMERICA LLC, Palo Alto, CA (US)

( * ) Notice:　Subject to any disclaimer, the term of this patent is extended or adjusted under 35 U.S.C. 154(b) by 629 days.

(21) Appl. No.: 17/982,991

(22) Filed:　Nov. 8, 2022

(65)　　　　Prior Publication Data

US 2023/0328227 A1　　Oct. 12, 2023

Related U.S. Application Data

(60) Provisional application No. 63/328,508, filed on Apr. 7, 2022.

(51) Int. Cl.
　　*H04N 19/105*　　　(2014.01)
　　*H04N 19/132*　　　(2014.01)
　　　　　　(Continued)
(52) U.S. Cl.
　　CPC ......... *H04N 19/105* (2014.11); *H04N 19/132* (2014.11); *H04N 19/176* (2014.11); *H04N 19/30* (2014.11)
(58) Field of Classification Search
　　CPC .... H04N 19/176; H04N 19/52; H04N 19/105; H04N 19/139; H04N 19/159; H04N 19/577; H04N 19/513; H04N 19/109
　　See application file for complete search history.

(56)　　　　References Cited

U.S. PATENT DOCUMENTS 8,873,626 B2　　10/2014　Karczewicz et al.
11,463,703 B2 *　10/2022　Liu ...................... H04N 19/105
　　　　　　(Continued)

FOREIGN PATENT DOCUMENTS

WO　　2019/001786 A1　　1/2019
WO　　2020/003262 A1　　1/2020
WO　　WO-2020132272 A1 *　6/2020　........... H04N 19/105

OTHER PUBLICATIONS

International Search Report dated Mar. 10, 2023 from the International Searching Authority in International Application No. PCT/US2022/049786.

(Continued)

*Primary Examiner* — Daniel Chang
(74) *Attorney, Agent, or Firm* — Sughrue Mion, PLLC

(57)　　　　ABSTRACT

Systems and methods for joint coding of motion vector difference using template matching based scaling factor derivation include receiving a current frame in a video bitstream, determining that a current block in the current frame is coded in a joint motion vector difference (JMVD) mode, selecting first neighboring reconstructed samples and second neighboring reconstructed samples of the current block as template areas used for predicting the current block in the JVMD mode, determining a prediction block from a reference frame based on a scaling factor derived from the selected template areas and applied to a motion vector difference (MVD) associated with the current block, and reconstructing the current block in the JVMD mode based at least on the prediction block.

17 Claims, 4 Drawing Sheets

300

```
┌─────────────────────────────────┐
│ RECEIVE A CURRENT FRAME INCLUDING A │    301
│ CURRENT BLOCK AND NEIGHBORING   │
│ BLOCKS                          │
└─────────────────────────────────┘
              ↓
┌─────────────────────────────────┐
│ SELECT FIRST TEMPLATE AREA AND SECOND │  302
│ TEMPLATE AREA FOR THE CURRENT BLOCK,  │
│ BASED ON JMVD MODE FOR THE CURRENT    │
│ BLOCK                           │
└─────────────────────────────────┘
              ↓
┌─────────────────────────────────┐
│ DETERMINE PREDICTION BLOCK FROM A │    303
│ REFERENCE FRAME BASED ON A SCALING │
│ FACTOR DERIVED FROM FIRST AND SECOND │
│ TEMPLATE AREAS                  │
└─────────────────────────────────┘
              ↓
┌─────────────────────────────────┐
│ RECONSTRUCT THE CURRENT BLOCK   │    304
└─────────────────────────────────┘
```

(51) Int. Cl.
    *H04N 19/176*        (2014.01)
    *H04N 19/30*         (2014.01)

(56)                References Cited

U.S. PATENT DOCUMENTS

| | | | | |
|---|---|---|---|---|
| 2008/0069227 | A1* | 3/2008 | Kondo | H04N 19/517 |
| | | | | 375/E7.125 |
| 2009/0225852 | A1* | 9/2009 | Nakaya | H04N 19/597 |
| | | | | 375/E7.123 |
| 2012/0230392 | A1* | 9/2012 | Zheng | H04N 19/196 |
| | | | | 375/E7.256 |
| 2013/0003849 | A1* | 1/2013 | Chien | H04N 19/517 |
| | | | | 375/E7.113 |
| 2013/0170553 | A1* | 7/2013 | Chen | H04N 19/13 |
| | | | | 375/240.16 |
| 2013/0177084 | A1* | 7/2013 | Wang | H04N 19/513 |
| | | | | 375/240.16 |
| 2014/0072042 | A1* | 3/2014 | Jeon | H04N 19/573 |
| | | | | 375/240.14 |
| 2014/0362922 | A1* | 12/2014 | Puri | H04N 19/196 |
| | | | | 375/240.16 |
| 2017/0048547 | A1* | 2/2017 | Kondo | H04N 19/573 |
| 2020/0045336 | A1 | 2/2020 | Xiu et al. | |
| 2020/0213612 | A1* | 7/2020 | Liu | H04N 19/53 |
| 2020/0374513 | A1 | 11/2020 | Xiu et al. | |
| 2022/0116623 | A1* | 4/2022 | Park | H04N 19/70 |
| 2022/0150505 | A1* | 5/2022 | Luo | H04N 19/176 |

OTHER PUBLICATIONS

Written Opinion dated Mar. 10, 2023 from the International Searching Authority in International Application No. PCT/US2022/049786.

Office Action issued Feb. 12, 2026 in Indian Application No. 202337074072.

\* cited by examiner

100

120
PROCESSOR(S)

130
MEMORY

110

140
STORAGE COMPONENT

150
COMMUNICATION INTERFACE

300

RECEIVE A CURRENT FRAME INCLUDING A CURRENT BLOCK AND NEIGHBORING BLOCKS — 301

SELECT FIRST TEMPLATE AREA AND SECOND TEMPLATE AREA FOR THE CURRENT BLOCK, BASED ON JMVD MODE FOR THE CURRENT BLOCK — 302

DETERMINE PREDICTION BLOCK FROM A REFERENCE FRAME BASED ON A SCALING FACTOR DERIVED FROM FIRST AND SECOND TEMPLATE AREAS — 303

RECONSTRUCT THE CURRENT BLOCK — 304

400

SYSTEMS AND METHODS FOR JOINT CODING OF MOTION VECTOR DIFFERENCE USING TEMPLATE MATCHING BASED SCALING FACTOR DERIVATION

CROSS-REFERENCE TO RELATED APPLICATION(S)

This application is based on and claims priority to U.S. Provisional Application No. 63/328,508, filed on Apr. 7, 2022, in the U.S. Patent and Trademark Office, the disclosure of which is incorporated by reference herein in its entirety.

BACKGROUND

1. Field

The disclosure relates to advanced image and video coding technologies, and more specifically, systems and methods for joint coding of motion vector difference using template matching based scaling factor derivation.

2. Description of Related Art

Streaming audiovisual content has gained in popularity. Substantial bandwidth is needed to facilitate the increasing quantity and increasing quality of such streaming content. Therefore there is a need for efficient coding and decoding schemes for streaming the content using less bandwidth while maintaining high quality. For example, H.265/HEVC, VP9, and AOMedia Video 1 (AV1) are some of the coding and decoding schemes that have been developed for this purpose.

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4).

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on Sep. 12, 2014, and Cisco's Thor was published on Aug. 11, 2015. Building on the codebase of VP9, AV1 incorporates additional techniques, several of which were developed in these experimental formats. The first version 0.1.0 of the AV1 reference codec was published on Apr. 7, 2016. The Alliance announced the release of the AV1 bitstream specification on Mar. 28, 2018, along with a reference, software-based encoder and decoder. On Jun. 25, 2018, a validated version 1.0.0 of the specification was released. On Jan. 8, 2019 a validated version 1.0.0 with Errata 1 of the specification was released. The AV1 bitstream specification includes a reference video codec.

Research and development for next-generation video codecs is also underway. For example, AOMedia has formally launched the standardization of the next-generation video codec called Versatile Video Coding (VVC).

VVC includes several improvements, such as the introduction of joint motion vector difference (JMVD) coding. This new inter prediction coding mode, named as JOINT_NEWMV, is applied to indicate whether the motion vector differences (MVDs) for two reference lists are jointly signaled. If the inter prediction mode is equal to JOINT_NEWMV mode, MVDs for a reference list 0 and a reference list 1 are jointly signaled, and only one MVD, named as joint_mvd, is signaled and transmitted to a decoder which derives the MVDs for reference list 0 and reference list 1 from joint_mvd. Generally, JOINT_NEWMV mode is signaled together with NEAR_NEARMV, NEAR_NEWMV, NEW_NEARMV, NEW_NEWMV, and GLOBAL_GLOBALMV mode. No additional contexts are added.

When JOINT_NEWMV mode is signaled, and the picture order count (POC) distance between two reference frames and the current frame is different, the MVD is scaled for reference list 0 or reference list 1 based on the POC distance. For example, if the distance (td0) between reference frame list 0 and the current frame is equal to or larger than the distance (td1) between reference frame list 1 and the current frame joint_mvd is directly used for reference list 0 and the MVD for reference list 1 is derived from joint_mvd based on equation (1).

$$derived\_mvd = \frac{td1}{td0} * joint\_mvd \tag{1}$$

Otherwise, if td1 is equal to or larger than td0, joint_mvd is directly used for reference list 1 and the MVD for reference list 0 is derived from joint_mvd based on equation (2).

$$derived\_mvd = \frac{td0}{td1} * joint\_mvd \tag{2}$$

When JMVD mode is selected for a block, a JMVD is signaled for two reference frames, and a MVD for the two reference frames is derived from the JMVD based on the distance between reference frames and a current frame. This assumes that there is a linear motion between a backward reference frame and a forward reference frame, with respect to the current frame. However, the motion between the two reference frames may not always be a linear motion. For example, the motion could become slower or faster from the backward reference frame to the forward reference frame.

SUMMARY

According to an aspect of the disclosure, there is provided a method that includes: receiving a current frame in a video bitstream that includes a current block and a plurality of neighboring blocks; determining that the current block is coded in a joint motion vector difference (JMVD) mode; in response to the current block being coded in the JMVD mode, selecting first neighboring reconstructed samples as a first template area, and second neighboring reconstructed samples of the current block as a second template area, used for predicting the current block in the JVMD mode; determining a prediction block from a reference frame based on a scaling factor derived from the selected first and second template areas and applied to a motion vector difference (MVD) associated with the current block; and reconstructing the current block in the JVMD mode based at least on the prediction block.

According to other aspects of the disclosure, an apparatus and computer readable medium consistent with the method are also provided.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Figure 1:
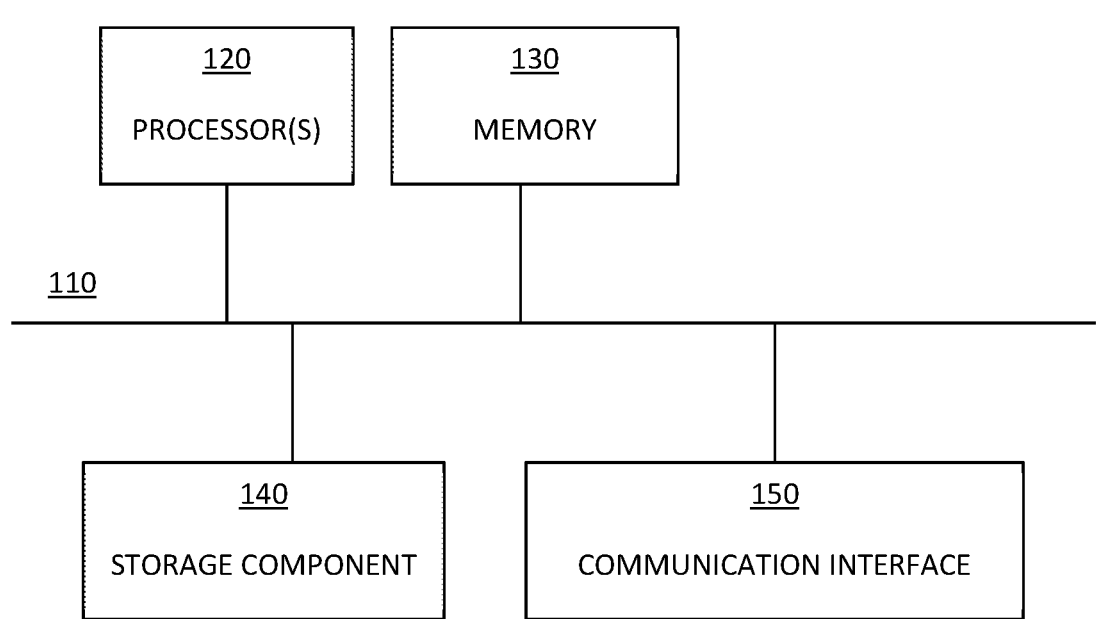
FIG. 1 is a diagram illustrating components of one or more devices, according to an various embodiments.

According to an aspect of the disclosure, there is provided a method that includes: for joint coding of motion vector difference (JMVD) in a video bitstream may include defining a first template area and a second template area for a current block of a current frame in a video bitstream, based on a joint motion vector difference (JMVD) mode for the current block; identifying a plurality of candidate scaling factors among a plurality of predetermined scaling factors; determining a scaling factor, among the plurality of candidate scaling factors, for a motion vector difference (MVD) associated with the current block, based on the first template area for the current block, the second template area for the current block, and the plurality of candidate scaling factors; and fetching a block from a reference frame based on the determined scaling factor.

The first template area for the current block may include a reconstructed sample of a block neighboring a left side of the current block, and the second template area for the current block include may include a reconstructed sample of a block neighboring a top side of the current block.

The method may include: predicting a first motion vector prediction (MVP) that corresponds to a backward reference frame that is prior to the current frame in a display order; and predicting a second MVP that corresponds to a forward reference frame that is after the current frame in the display order.

The determining a scaling factor, among the plurality of candidate scaling factors, for a MVD associated with the current block may include: generating a plurality of first prediction blocks, where each of the plurality of first prediction blocks corresponds to a candidate scaling factor among the plurality of candidate scaling factors; and generating a plurality of second prediction blocks, where each of the plurality of second prediction blocks corresponds to a candidate scaling factor among the plurality of candidate scaling factors.

The generating the plurality of first prediction blocks may include: determining a plurality of first MVDs based on the first MVP and a plurality of first reference frames; scaling each of the plurality of first MVDs based on the plurality of candidate scaling factors to obtain a plurality of scaled first MVDs for each of the plurality of scaling factors; and generating a first prediction block, for each candidate scaling factor among the plurality of candidate scaling factors, using a motion vector equal to a sum of the first MVP and the plurality of scaled first MVDs corresponding to each candidate scaling factor.

The generating the plurality of second prediction blocks may include: determining a plurality of second MVDs based on the second MVP and a plurality of second reference frames; scaling each of the plurality of second MVDs based on the plurality of candidate scaling factors to obtain a plurality of scaled second MVDs for each of the plurality of scaling factors; and generating a second prediction block, for each candidate scaling factor among the plurality of candidate scaling factors, using a motion vector equal to a sum of the second MVP and the plurality of scaled second MVDs corresponding to each candidate scaling factor.

The method may further include: determining a first template area in each of a plurality of first reference frames, based on the plurality of first prediction blocks, the first template area in each first reference frame corresponding to the first template area for the current block in the current frame; determining a second template area in each of the plurality of first reference frames, based on the plurality of first prediction blocks, that correspond to the second template area for the current block, the second template area in each first reference frame corresponding to the second template area for the current block in the current frame; determining a first template area in each of a plurality of second reference frames, based on the plurality of second prediction blocks, the first template area in each second reference frame corresponding to the first template area for the current block in the current frame; and determining a second template area in each of the plurality of second reference frames, based on the plurality of second prediction blocks, the second template area in each second reference frame corresponding to the second template area for the current block in the current frame.

The method may further include: generating a plurality of first template predictions associated with the current frame, based on a weighted average of the first template area associated with each first prediction block and the first template area associated with each second prediction block; and generating a plurality of second template predictions associated with the current frame, based on a weighted average of the second template area associated with each first prediction block and the second template area associated with each second prediction block.

The method may further include: determining a difference between each first template prediction and the first template area for the current frame; determining a difference between each second template prediction and the second template area for the current frame; and evaluating the determined differences based on a cost criterion, wherein a scaling factor associated with a lowest cost based on the cost criterion is determined as the scaling factor for the MVD associated with the current block.

The cost criterion may include a sum of absolute difference (SAD), a sum of squared error (SSE), or a sum of absolute transform difference (SATD).

According to an aspect of the disclosure, there is provided an apparatus that includes: a memory storing program code; and at least one processor configured to execute the program code and operate as instructed by the program code. The program code may include: defining code configured to cause at least one of the at least one processor to define a first template area and a second template area for a current block of a current frame in a video bitstream, based on joint motion vector difference (JMVD) mode for the current block, identifying code configured to cause at least one of the at least one processor to identify a plurality of candidate scaling factors among a plurality of predetermined scaling factors, determining code configured to cause at least one of the at least one processor to determine a scaling factor, among the plurality of candidate scaling factors, for a motion vector difference (MVD) associated with the current block, based on the first template area for the current block, the second template area for the current block, and the plurality of candidate scaling factors, and fetching code configured to cause at least one of the at least one processor to fetch a block from a reference frame based on the determined scaling factor.

The program code may further include: predicting code configured to cause at least one of the at least one processor to predict a first motion vector prediction (MVP) that corresponds to a backward reference frame that is prior to the current frame in a display order; and predicting code configured to cause at least one of the at least one processor to predict a second MVP that corresponds to a forward reference frame that is after the current frame in the display order.

The determining code may include: generating code configured to cause at least one of the at least one processor to generate a plurality of first prediction blocks, wherein each of the plurality of first prediction blocks corresponds to a candidate scaling factor among the plurality of candidate scaling factors; and generating code configured to cause at least one of the at least one processor to generate a plurality of second prediction blocks, wherein each of the plurality of second prediction blocks corresponds to a candidate scaling factor among the plurality of candidate scaling factors.

The program code may further include: generating code configured to cause at least one of the at least one processor to generate a plurality of first template predictions associated with the current frame, based on a weighted average of a first template area in each of a plurality of first reference frames, based on the plurality of first prediction blocks, and a first template area in each of a plurality of second reference frames, based on the plurality of second prediction blocks; and generating code configured to cause at least one of the at least one processor to generate a plurality of second template predictions associated with the current frame, based on a weighted average of a second template area in each first reference frame, based on the plurality of first prediction blocks, and a second template area in each second reference frame, based on the plurality of second prediction blocks.

The program code may further include: determining code configured to cause at least one of the at least one processor to determine a difference between each first template prediction and the first template area for the current frame; determining code configured to cause at least one of the at least one processor to determine a difference between each second template prediction and the second template area for the current frame; and evaluating code configured to cause at least one of the at least one processor to evaluate the determined differences based on a cost criterion, wherein a scaling factor associated with a lowest cost based on the cost criterion is determined as the scaling factor for the MVD associated with the current block.

According to an aspect of the disclosure, there is provided a non-transitory computer readable medium that stores computer readable program code which, when executed by a processor, cause the processor to at least: define a first template area and a second template area for a current block of a current frame in a video bitstream, based on a joint motion vector difference (JMVD) mode for the current block; identify a plurality of candidate scaling factors among a plurality of predetermined scaling factors; determine a scaling factor, among the plurality of candidate scaling factors, for a motion vector difference (MVD) associated with the current block, based on the first template area for the current block, the second template area for the current block, and the plurality of candidate scaling factors; and fetch a block from a reference frame based on the determined scaling factor The program code may further cause the processor to at least: predict a first motion vector prediction (MVP) that corresponds to a backward reference frame that is prior to the current frame in a display order; and predict a second MVP that corresponds to a forward reference frame that is after the current frame in the display order.

The program code that cause the processor to determine a scaling factor may further cause the processor to at least: generate a plurality of first prediction blocks, wherein each of the plurality of first prediction blocks corresponds to a candidate scaling factor among the plurality of candidate scaling factors; and generate a plurality of second prediction blocks, wherein each of the plurality of second prediction blocks corresponds to a candidate scaling factor among the plurality of candidate scaling factors.

The program code may further cause the processor to at least: generate a plurality of first template predictions associated with the current frame, based on a weighted average of a first template area in each of a plurality of first reference frames, based on the plurality of first prediction blocks, and a first template area in each of a plurality of second reference frames, based on the plurality of second prediction blocks; and generate a plurality of second template predictions associated with the current frame, based on a weighted average of a second template area in each first reference frame, based on the plurality of first prediction blocks, and a second template area in each second reference frame, based on the plurality of second prediction blocks.

The program code may further cause the processor to at least: determine a difference between each first template prediction and the first template area for the current frame; determine a difference between each second template prediction and the second template area for the current frame; and evaluate the determined differences based on a cost criterion, wherein a scaling factor associated with a lowest cost based on the cost criterion is determined as the scaling factor for the MVD associated with the current block.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flow diagrams and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As set forth above, when the MVDs are jointly signaled to perform joint coding of motion vector differences, VVC assumes that there is a linear motion between a backward reference frame and a forward reference frame. However, the motion between two reference frames may not be always linear motion. For example, the motion could become slower or faster from the backward reference frame to the forward reference frame.

Various embodiments according to the disclosure provide a system and method for template matching based scaling factor derivation for joint coding of motion vector difference. When a joint motion vector difference (JMVD) mode is selected for a current block in a current frame, template areas are defined in the current frame and in a plurality of reference frames. The template areas in the plurality of reference frames are based on a predicted first motion vector prediction (MVP) or a predicted second MVP, and these template areas are used to generate template predictions for the current block. The template predictions for the current block are compared with the defined template areas for the current block based on a criterion to select a scaling factor, and the selected scaling factor is used to fetch a corresponding a prediction block.

FIG. 1 is a diagram illustrating components of one or more devices, according to various embodiments. Referring to FIG. 1, the device 100 may include a bus 110, one or more processor(s) 120, a memory 130, a storage component 140, and a communication interface 150. It is understood that one or more of the components may be omitted and/or one or more additional components may be included.

The bus 110 includes a component that permits communication among the components of the device 100. The processor 120 may be implemented in hardware, firmware, or a combination of hardware and software. The processor 120 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a sparse tensor core, or another type of processing component. The processor 120 may include one or more processors. For example, the processor 120 may include one or more CPU, APU, FPGA, ASIC, sparse tensor core, or another type of processing component. The one or more processors of the processor 120 may be capable of being programmed to perform a function.

The memory 130 includes a random access memory (RAM), a read only memory (ROM), and/or another type of dynamic or static storage device (e.g., a flash memory, a magnetic memory, and/or an optical memory) that stores information and/or instructions for use by the processor 120.

The storage component 140 stores information and/or software related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The communication interface 150 includes a transceiver-like component (e.g., a transceiver and/or a separate receiver and transmitter) that enables the device 100 to communicate with other devices, such as via a wired connection, a wireless connection, or a combination of wired and wireless connections. The communication interface 150 may permit the device 100 to receive information from another device and/or provide information to another device. For example, the communication interface 150 may include an Ethernet interface, an optical interface, a coaxial interface, an infrared interface, a radio frequency (RF) interface, a universal serial bus (USB) interface, a Wi-Fi interface, a cellular network interface, or the like.

The device 100 may perform one or more processes or functions described herein. The device 100 may perform operations based on the processor 120 executing software instructions stored by a non-transitory computer-readable medium, such as the memory 130 and/or the storage component 140. A computer-readable medium is defined herein as a non-transitory memory device. A memory device includes memory space within a single physical storage device or memory space spread across multiple physical storage devices.

Software instructions may be read into the memory 130 and/or the storage component 140 from another computer-readable medium or from another device via the communication interface 150. When executed, software instructions stored in the memory 130 and/or storage component 140 may cause the processor 120 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, device 100 may include additional components, fewer components, different components, or differently arranged components than those shown in FIG. 1. Additionally, or alternatively, a set of components (e.g., one or more components) of device 100 may perform one or more functions described as being performed by another set of components of device 100.

Any one of the operations or processes described below (e.g., FIGS. 2-4) may be implemented by or using any one of the elements illustrated in FIG. 1.

Figure 2:
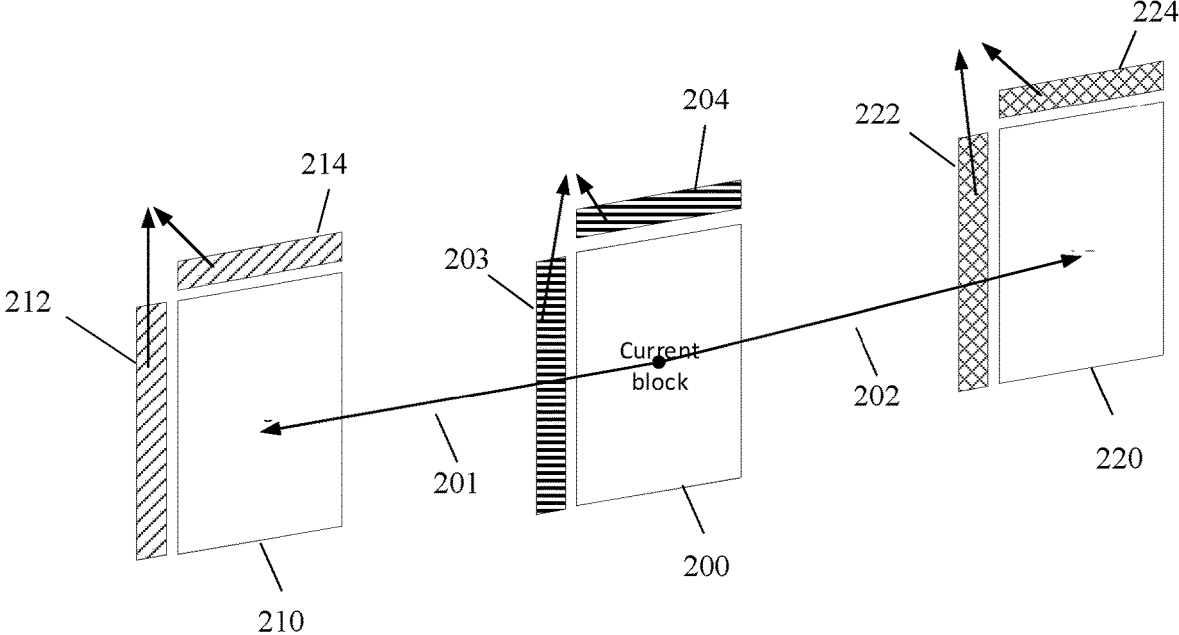
FIG. 2 is a diagram illustrating template matching based scaling factor derivation for joint coding of motion vector difference, according to various embodiments.

FIG. 2 is a diagram illustrating template matching based scaling factor derivation, according to various embodiments. As shown in FIG. 2, JMVD mode may be selected for a current block 200. The current block 200 may belong to a current frame in a bitstream that is being processed with a coding/decoding scheme, such as with versatile video coding (VVC).

When JMVD mode is selected for the current block 200, a first template area 203 and a second template area 204 may be defined. The first template area 203 and second template area 204 may be reconstructed samples of a neighboring block. For example, the first template area 203 may be a reconstructed sample of a block that is neighboring the current block 200 on the left, and second template area 204 may be a reconstructed sample of a block that is neighboring the current block on the top.

Additionally, when JMVD mode is selected for the current block 200, a first motion vector prediction (MVP) 201 and a second MVP 202 may be predicted. The first MVP 201 corresponds to a backward reference frame that is prior to the current frame in a display order of the frames, and the second MVP 202 corresponds to a forward reference frame that is after the current frame in the display order of the frames.

Based on the first MVP 201, a plurality of first motion vector differences (MVDs) may be calculated. Each first MVD may correspond to a reference frame in a first list of reference frames. The first list of reference frames may include a plurality of backward reference frames.

Based on the second MVP 202, a plurality of second MVDs may be calculated, each second MVD corresponding to a reference frame in a second list of reference frames. The second list of reference frames may include a plurality of forward reference frames.

According to various embodiments, a plurality of candidate scaling factors may be identified from a group of predetermined scaling factors. Each of the plurality of candidate scaling factors may be applied to the plurality of first MVDs to generate a plurality of scaled first MVDs corresponding to each candidate scaling factor. For example, a plurality of scaled first MVDs may be generated for a first candidate scaling factor by applying the first candidate scaling factor to the plurality of first MVDs, and a plurality of scaled first MVDs may be generated for a second candidate scaling factor by applying the second candidate scaling factor to the plurality of first MVDs. Additionally, each of the plurality of candidate scaling factors may be applied to the plurality of second MVDs to generate a plurality of scaled second MVDs corresponding to each candidate scaling factor. For example, a plurality of scaled second MVDs may be generated for a first candidate scaling factor by applying the first candidate scaling factor to the plurality of second MVDs, and a plurality of scaled second MVDs may be generated for a second candidate scaling factor by applying the second candidate scaling factor to the plurality of first MVDs.

A plurality of first prediction blocks may be generated for each candidate scaling factor among the plurality of candidate scaling factors based on the first MVP and the corresponding plurality of scaled first MVDs. For example, a first prediction block may be generated for a first candidate scaling factor based on the first MVP and the plurality of scaled first MVDs corresponding to the first candidate scaling factor, and a first prediction block may be generated for a second candidate scaling factor based on the first MVP and the plurality of scaled first MVDs corresponding to the second candidate scaling factor. As shown in FIG. 2, the first prediction block 210 may be generated for a candidate scaling factor among the plurality of candidate scaling factors. The first prediction block 210 may be generated using a motion vector equal to a sum of the first MVP 201 and the plurality of scaled first MVDs corresponding to the candidate scaling factor.

A plurality of second prediction blocks may be generated for each candidate scaling factor among the plurality of candidate scaling factors based on the second MVP and the corresponding plurality of scaled second MVDs. For example, a second prediction block may be generated for a first candidate scaling factor based on the second MVP and the plurality of scaled second MVDs corresponding to the first candidate scaling factor, and a second prediction block may be generated for a second candidate scaling factor based on the second MVP and the plurality of scaled second MVDs corresponding to the second candidate scaling factor. As shown in FIG. 2, the second prediction block 220 may be generated for a candidate scaling factor among the plurality of candidate scaling factors. The second prediction block 220 may be generated using a motion vector equal to a sum of the second MVP 202 and the plurality of scaled second MVDs corresponding to the candidate scaling factor.

A first template area may be defined for the plurality of first prediction blocks and for the plurality of second prediction blocks, that correspond to the first template area 203. For example, the first template area 212 may be defined for the first prediction block 210, and the first template area 222 may be defined for the second prediction block 220. The first template area 212 and the first template area 222 may correspond to the first template area 203.

A second template area may be defined for the plurality of first prediction blocks and for the plurality of second prediction blocks, that correspond to the second template area 204. For example, the second template area 214 may be defined for the first prediction block 210, and the second template area 224 may be defined for the second prediction block 220. The second template area 214 and the second template area 224 may correspond to the second template area 204.

The first template area associated with the plurality of first prediction blocks and the first template area associated with the plurality of second prediction blocks may be weight-averaged to generate a plurality of predicted first template areas associated with the current block 200. Each predicted first template area among the plurality of predicted first template areas may correspond to a candidate scaling factor among the plurality of candidate scaling factors. For example, the first template area 212 and the first template area 222 may be weight-averaged to generate a predicted first template area associated with the current block 200 among the plurality of predicted first template areas associated with the current block 200.

The second template area associated with the plurality of first prediction blocks and the second template area associated with the plurality of second prediction blocks may be weight-averaged to generate a plurality of predicted second template areas associated with the current block 200. Each predicted second template area among the plurality of predicted second template areas may correspond to a candidate scaling factor among the plurality of candidate scaling factors. For example, the second template area 214 and the second template area 224 may be weight-averaged to generate a predicted second template area associated with the current block 200 among the plurality of predicted second template areas associated with the current block 200.

A difference between each predicted first template area and the first template area 203 may be determined, and a difference between each predicted second template area and the second template area 204 may be determined. The differences may be evaluated based on a cost criterion, and a candidate scaling factor corresponding to a lowest cost may be used as a predicted scaling factor for a MVD of the current block 200.

According to various embodiments, the cost criterion may include, but is not limited to, a sum of absolute difference (SAD), a sum of squared error (SSE), or a sum of absolute transform difference (SATD).

According to various embodiments, an index or flag associated with each of the plurality of candidate scaling factors may be signaled, and the predicted scaling factor may be used as a context for entropy coding of the index or flag.

According to various embodiments, instead of signaling the index or flag associated with each of the plurality of candidate scaling factors explicitly, the predicted scaling factor may be used to reorder the candidate scaling factors, and the index or flag of the reordered candidate scaling factors is signaled.

According to various embodiments, instead of signaling the index or flag associated with each of the plurality of candidate scaling factors explicitly, the predicted scaling factor may be directly used as the scaling factor for deriving a MVD used for generating the first prediction block 210 or the second prediction block 220.

According to various embodiments, the index or flag of the candidate scaling factors may be either explicitly signaled in the bitstream or implicitly derived based on template matching as described above. The selection between explicit signaling and implicit derivation may be signaled.

According to various embodiments, the predicted scaling factor may be derived from a plurality of candidate scaling factors that are different from a plurality of candidate scaling factors that are explicitly signaled.

According to various embodiments, the plurality of candidate scaling factors that are explicitly signaled may include a limited number of candidates (e.g., 1, ½, 2), and the predicted scaling factor may be derived from a larger set of candidates (e.g., 1, ⅛, ⅖, ⅜, ⅘, . . . , ¹⁵/₈, ¹⁶/₈, . . . , ³²/₈).

Figure 3:
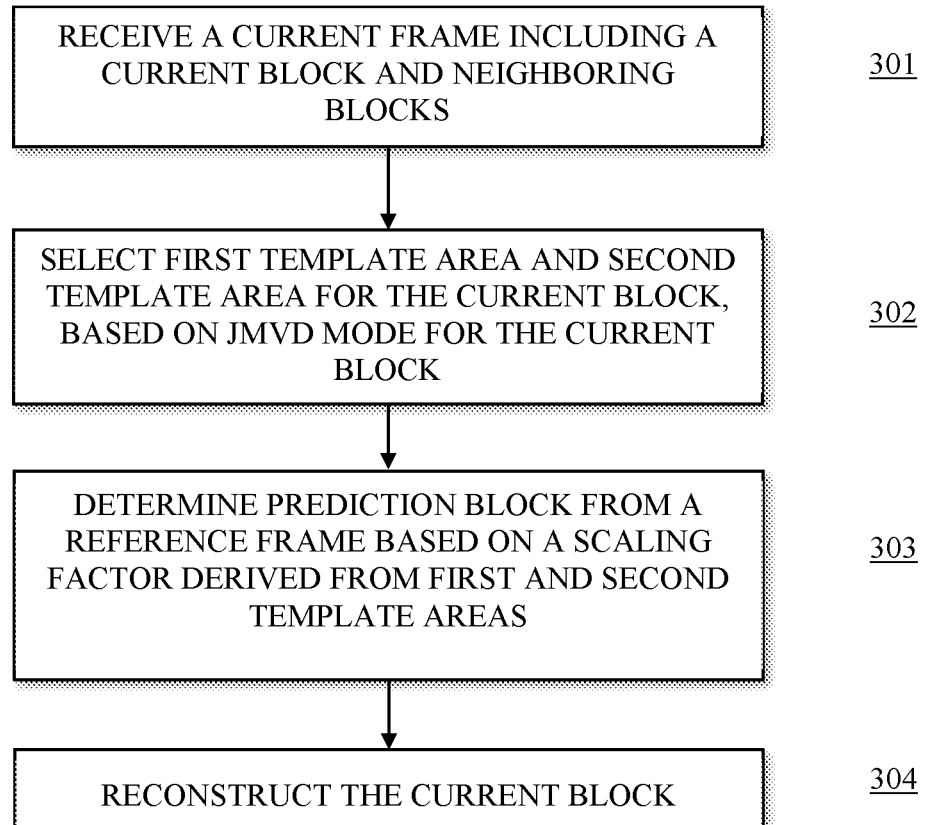
FIG. 3 is a flow diagram illustrating a method for joint coding of motion vector difference in a video bitstream, according to various embodiments.

FIG. 3 is a flow diagram illustrating a method 300 for joint coding of motion vector difference in a video bitstream, according to various embodiments.

At 301, the method 300 includes receiving a current frame including a current block and neighboring blocks. For example, the device 100 may receive a current frame in a video bitstream comprising a current block 200 and neighboring blocks.

At 302, the method 300 includes selecting a first template area and a second template area for the current block based on a determination that the current block is coded in a JMVD mode. For example, the device 100 may determine that the current block is coded in a JMVD mode, and in response to the current block being coded in the JMVD mode, the device 100 may select first neighboring reconstructed samples as a first template area 203, and second neighboring reconstructed samples of the current block as a second template area 204, used for predicting the current block in the JVMD mode.

At 303, the method 300 includes determining a prediction block from a reference frame based on a scaling factor. The scaling factor may be derived based on the first and second template areas and a MVD. For example, the device 100 may determine a prediction block from a reference frame based on a scaling factor derived from the selected first template area 203 and second template area 204. The device 100 may apply the scaling factor to a motion vector difference (MVD) associated with the current block 200, to determine the prediction block. The determining the scaling factor for the MVD associated with the current block is discussed in more detail with respect to FIG. 4.

At 304, the method 300 includes reconstructing the current block. For example, the device 100 may reconstruct the current block 200 based on the determined prediction block.

Figure 4:
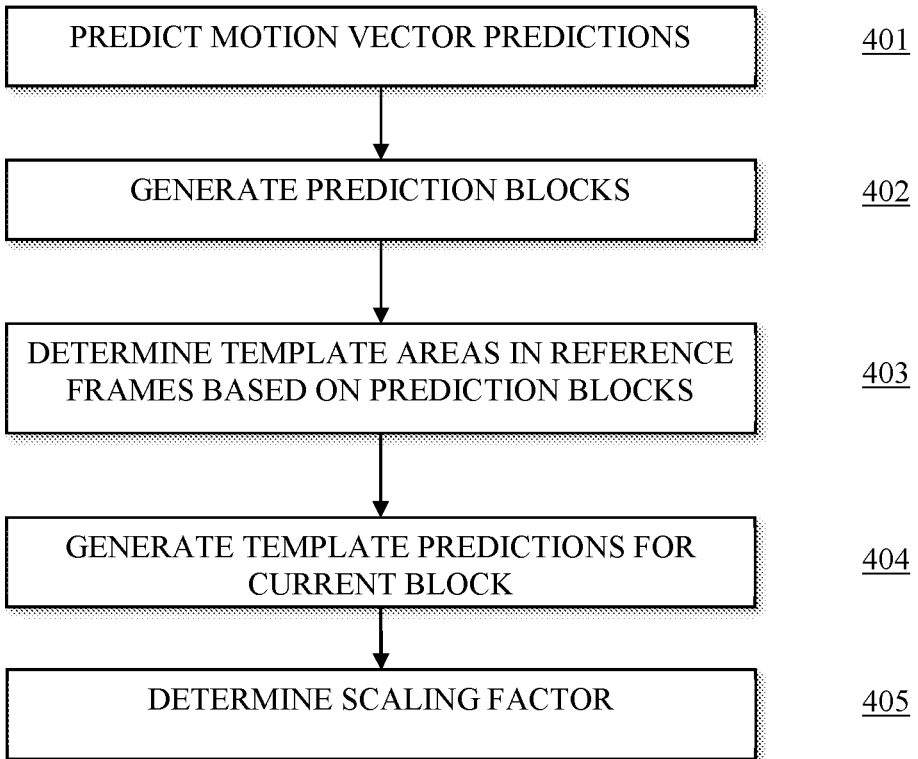
FIG. 4 is a flow diagram illustrating a method for determining a scaling factor using template matching based scaling factor derivation, according to various embodiments.

FIG. 4 is a flow diagram illustrating a method 400 for determining a scaling factor using template matching based scaling factor derivation, according to various embodiments.

At 401, the method 400 includes predicting a plurality of MVPs. For example, the device 100 may predict the first MVP 201 that corresponds to a backward reference frame that is prior to the current frame in a display order, and the device 100 may predict the second MVP 202 that corresponds to a forward reference frame that is after the current frame in the display order.

At 402, the method 400 includes generating a plurality of prediction blocks. For example, the device 100 may generate a plurality of first prediction blocks (e.g., first prediction block 210). Each of the plurality of first prediction blocks corresponds to a candidate scaling factor among the plurality of candidate scaling factors. The device 100 may generate a plurality of second prediction blocks (e.g., second prediction block 220). Each of the plurality of second prediction blocks corresponds to a candidate scaling factor among the plurality of candidate scaling factors.

The device 100 may generate the plurality of first prediction blocks by determining a plurality of first MVDs based on the first MVP 201 and a plurality of first reference frames. The device 100 may sale each of the plurality of first MVDs based on the plurality of candidate scaling factors to obtain a plurality of scaled first MVDs for each of the plurality of scaling factors. The device 100 may generate a first prediction block, for each candidate scaling factor among the plurality of candidate scaling factors, using a motion vector equal to a sum of the first MVP 201 and the plurality of scaled first MVDs corresponding to each candidate scaling factor.

The device 100 may generate the plurality of second prediction blocks by determining a plurality of second MVDs based on the second MVP 202 and a plurality of second reference frames. The device 100 may scale each of the plurality of second MVDs based on the plurality of candidate scaling factors to obtain a plurality of scaled second MVDs for each of the plurality of scaling factors. The device 100 may generate a second prediction block, for each candidate scaling factor among the plurality of candidate scaling factors, using a motion vector equal to a sum of the second MVP 202 and the plurality of scaled second MVDs corresponding to each candidate scaling factor.

At 403, the method 400 may determine template areas in each first reference frame among the plurality of first reference frames and in each second reference frame among the plurality of second reference frames, based on the plurality of prediction blocks. For example, the device 100 may determine a first template area for each of the plurality of first prediction blocks, that correspond to the first template area 203 for the current block 200. The first template area for each of the plurality of first prediction blocks may include a reconstructed sample of a block neighboring a left side of a block that corresponds to the first prediction block in each of the plurality of first reference frames. The device 100 may determine a second template area for each of the plurality of first prediction blocks, that correspond to the second template area 204 for the current block 200. The second template area for each of the plurality of first prediction blocks may include a reconstructed sample of a block neighboring a top side of a block that corresponds to the first prediction block in each of the plurality of first reference frames. The device 10 may determine a first template area for each of the plurality of second prediction blocks, that correspond to the first template area 203 for the current block 200. The first template area for each of the plurality of second prediction blocks may include a reconstructed sample of a block neighboring a left side of a block that corresponds to the second prediction block in each of the plurality of second reference frames. The device 100 may determine a second template area for each of the plurality of second prediction blocks, that correspond to the second template area 204 for the current block 200. The second template area for each of the plurality of second prediction blocks may include a reconstructed sample of a block neighboring a top side of a block that corresponds to the second prediction block in each of the plurality of second reference frames.

At 404, the method 400 may include generating a plurality of template predictions. For example, the device 100 may generate a plurality of first template predictions associated with the current frame, based on a weighted average of the first template area associated with the plurality of first prediction blocks and the first template area associated with the plurality of second prediction blocks. The device 100 may generate a plurality of second template predictions associated with the current frame, based on a weighted average of the second template area associated with the plurality of first prediction blocks and the second template area associated with the plurality of second prediction blocks.

At 405, the method 400 may include determining a scaling factor, among the plurality of candidate scaling factors, for a MVD associated with the current block. For example, the device 100 may determine a difference between each first template prediction and the first template area for the current frame, and a difference between each second predicted template area and the second template area for the current frame. The device 100 may evaluate the determined differences based on a cost criterion. The device 100 may determine a scaling factor associated with a lowest cost based on the cost criterion as the scaling factor for the MVD associated with the current block 200. The cost criterion may include a sum of absolute difference (SAD), a sum of squared error (SSE), or a sum of absolute transform difference (SATD).

According to various example embodiments, a joint coding of motion vector difference may be performed using a template matching based scaling factor derivation. The joint coding operation may be used even when there is a nonlinear motion between a backward reference frame and a forward reference frame with respect to a current block of a current frame. Provided are systems and methods for performing joint coding of motion vector difference by defining template areas for the current block, identifying candidate scaling factors, generating prediction blocks based on the candidate scaling factors, defining template areas for each generated prediction block, and determining a scaling factor for a MVD of the current block.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flow diagram and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow diagram and/or block diagram block or blocks.

The flow and block diagrams in the Figures illustrate the architecture, functionality, and operation of possible implementations of systems, methods, and computer readable media according to various embodiments. In this regard, each block in the flow diagram or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, may be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for video decoding in a decoder, the method comprising:

receiving a current frame in a video bitstream comprising a current block and a plurality of neighboring blocks;

determining that the current block is coded in a joint motion vector difference (JMVD) mode;

in response to the current block being coded in the JMVD mode, selecting first neighboring reconstructed samples as a first template area, and second neighboring reconstructed samples of the current block as a second template area, used for predicting the current block in the JVMD mode;

determining a prediction block from a reference frame based on a scaling factor derived from the selected first and second template areas and applied to a motion vector difference (MVD) associated with the current block;

predicting a first motion vector prediction (MVP) that corresponds to a backward reference frame that is prior to the current frame in a display order;

predicting a second MVP that corresponds to a forward reference frame that is after the current frame in the display order; and reconstructing the current block in the JVMD mode based at least on the prediction block.

2. The method of claim 1, wherein determining the prediction block from the reference frame based on the scaling factor comprises:

identifying a plurality of candidate scaling factors among a plurality of predetermined scaling factors; and determining a scaling factor, among the plurality of candidate scaling factors, for the MVD associated with the current block, based on the first template area for the current block, the second template area for the current block, and the plurality of candidate scaling factors.

3. The method of claim 1, wherein the determining the scaling factor comprises:

generating a plurality of first prediction blocks, each of the plurality of first prediction blocks corresponding to a first candidate scaling factor among the plurality of candidate scaling factors; and generating a plurality of second prediction blocks, each of the plurality of second prediction blocks corresponding to a second candidate scaling factor among the plurality of candidate scaling factors.

4. The method of claim 3, wherein generating the plurality of first prediction blocks comprises:

determining a plurality of first MVDs based on the first MVP and a plurality of first reference frames;

scaling each of the plurality of first MVDs based on the plurality of candidate scaling factors to obtain a plurality of scaled first MVDs for each of the plurality of scaling factors; and generating a first prediction block, for each candidate scaling factor among the plurality of candidate scaling factors, using a motion vector equal to a sum of the first MVP and the plurality of scaled first MVDs corresponding to each candidate scaling factor.

5. The method of claim 3, wherein generating the plurality of second prediction blocks comprises:

determining a plurality of second MVDs based on the second MVP and a plurality of second reference frames;

scaling each of the plurality of second MVDs based on the plurality of candidate scaling factors to obtain a plurality of scaled second MVDs for each of the plurality of scaling factors; and generating a second prediction block, for each candidate scaling factor among the plurality of candidate scaling factors, using a motion vector equal to a sum of the second MVP and the plurality of scaled second MVDs corresponding to each candidate scaling factor.

6. The method of claim 3, further comprising:

determining a first template area in each of a plurality of first reference frames, based on the plurality of first prediction blocks, the first template area in each first reference frame corresponding to the first template area for the current block in the current frame;

determining a second template area in each of the plurality of first reference frames, based on the plurality of first prediction blocks, that correspond to the second template area for the current block, the second template area in each first reference frame corresponding to the second template area for the current block in the current frame;

determining a first template area in each of a plurality of second reference frames, based on the plurality of second prediction blocks, the first template area in each second reference frame corresponding to the first template area for the current block in the current frame; and determining a second template area in each of the plurality of second reference frames, based on the plurality of second prediction blocks, the second template area in each second reference frame corresponding to the second template area for the current block in the current frame.

7. The method of claim 6, further comprising:

generating a plurality of first template predictions associated with the current frame, based on a weighted average of the first template area associated with each first prediction block and the first template area associated with each second prediction block; and generating a plurality of second template predictions associated with the current frame, based on a weighted average of the second template area associated with each first prediction block and the second template area associated with each second prediction block.

8. The method of claim 7, further comprising:

determining a first difference between each first template prediction and the first template area for the current frame;

determining a second difference between each second template prediction and the second template area for the current frame; and evaluating the first and second differences based on a cost criterion, wherein a scaling factor associated with a lowest cost based on the cost criterion is determined as the scaling factor for the MVD associated with the current block.

9. The method of claim 8, wherein the cost criterion includes a sum of absolute difference (SAD), a sum of squared error (SSE), or a sum of absolute transform difference (SATD).

10. A method of video encoding, the method comprising:

receiving a current frame comprising a current block and a plurality of neighboring blocks;

determining that the current block is to be coded in a joint motion vector difference (JMVD) mode; and encoding the current block in the JMVD mode, encoding the current block in the JMVD mode signals to:

select, in response to the current block being coded in the JMVD mode, first neighboring reconstructed samples as a first template area, and second neighboring reconstructed samples of the current block as a second template area, used for predicting the current block in the JVMD mode;

determine a prediction block from a reference frame based on a scaling factor derived from the selected first and second template areas and applied to a motion vector difference (MVD) associated with the current block;

predict a first motion vector prediction (MVP) that corresponds to a backward reference frame that is prior to the current frame in a display order;

predict a second MVP that corresponds to a forward reference frame that is after the current frame in the display order; and reconstruct the current block in the JVMD mode based at least on the prediction block.

11. The method of claim 10, wherein encoding the current block in the JMVD mode further signals to: generate a plurality of first prediction blocks, wherein each of the plurality of first prediction blocks corresponds to a first candidate scaling factor among the plurality of candidate scaling factors; and generate a plurality of second prediction blocks, wherein each of the plurality of second prediction blocks corresponds to a second candidate scaling factor among the plurality of candidate scaling factors.

12. The method of claim 11, wherein encoding the current block in the JMVD mode further signals to: generate a plurality of first template predictions associated with the current frame, based on a weighted average of a first template area in each of a plurality of first reference frames, based on the plurality of first prediction blocks, and a first template area in each of a plurality of second reference frames, based on the plurality of second prediction blocks; and generate a plurality of second template predictions associated with the current frame, based on a weighted average of a second template area in each first reference frame, based on the plurality of first prediction blocks, and a second template area in each second reference frame, based on the plurality of second prediction blocks.

13. The method of claim 12, wherein encoding the current block in the JMVD mode further signals to: determine a first difference between each first template prediction and the first template area for the current frame;

determine a second difference between each second template prediction and the second template area for the current frame; and evaluate the first and second differences based on a cost criterion, wherein a scaling factor associated with a lowest cost based on the cost criterion is determined as the scaling factor for the MVD associated with the current block.

14. A method of encoding visual media data, the method comprising:

generating a bitstream, comprising a current block and a plurality of neighboring blocks of the visual media data according to an encoding process including:

determining that the current block is to be coded in a joint motion vector difference (JMVD) mode; and encoding the current block in the JMVD mode, encoding the current block in the JMVD mode signals to:

in response to the current block being coded in the JMVD mode, select first neighboring reconstructed samples as a first template area, and second neighboring reconstructed samples of the current block as a second template area, used for predicting the current block in the JVMD mode;

determine a prediction block from a reference frame based on a scaling factor derived from the selected first and second template areas and applied to a motion vector difference (MVD) associated with the current block;

predict a first motion vector prediction (MVP) that corresponds to a backward reference frame that is prior to a current frame in a display order;

predict a second MVP that corresponds to a forward reference frame that is after the current frame in the display order; and reconstruct the current block in the JVMD mode based at least on the prediction block; and transmitting the generated bitstream of the visual media data.

15. The non-transitory computer readable medium of claim 14, wherein encoding the current block in the JMVD mode further signals to:

generate a plurality of first prediction blocks, wherein each of the plurality of first prediction blocks corresponds to a first candidate scaling factor among the plurality of candidate scaling factors; and generate a plurality of second prediction blocks, wherein each of the plurality of second prediction blocks corresponds to a second candidate scaling factor among the plurality of candidate scaling factors.

16. The non-transitory computer readable medium of claim 15, wherein encoding the current block in the JMVD mode further signals to:

generate a plurality of first template predictions associated with the current frame, based on a weighted average of a first template area in each of a plurality of first reference frames, based on the plurality of first prediction blocks, and a first template area in each of a plurality of second reference frames, based on the plurality of second prediction blocks; and generate a plurality of second template predictions associated with the current frame, based on a weighted average of a second template area in each first reference frame, based on the plurality of first prediction blocks, and a second template area in each second reference frame, based on the plurality of second prediction blocks.

17. The non-transitory computer readable medium of claim 16, wherein encoding the current block in the JMVD mode further signals to:

determine a first difference between each first template prediction and the first template area for the current frame;

determine a second difference between each second template prediction and the second template area for the current frame; and evaluate the first and second differences based on a cost criterion, wherein a scaling factor associated with a lowest cost based on the cost criterion is determined as the scaling factor for the MVD associated with the current block.

* * * * *